(12) United States Patent
Lerch et al.

(10) Patent No.: US 10,742,662 B2
(45) Date of Patent: Aug. 11, 2020

(54) NON-TRANSACTION ENABLING DATA SECURITY

(71) Applicant: Apple Inc., Cupertino, CA (US)

(72) Inventors: Matthias Lerch, Cupertino, CA (US); Marc Berges Garrido, Cupertino, CA (US); Ashley Martin, Cupertino, CA (US); Rahul Singh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 15/718,321

(22) Filed: Sep. 28, 2017

(65) Prior Publication Data

US 2019/0098018 A1 Mar. 28, 2019

(51) Int. Cl.
| | |
|---|---|
| *H04L 29/06* | (2006.01) |
| *H04W 12/02* | (2009.01) |
| *G07C 9/27* | (2020.01) |
| *G07C 9/29* | (2020.01) |

(52) U.S. Cl.
CPC .............. *H04L 63/126* (2013.01); *G07C 9/27* (2020.01); *G07C 9/29* (2020.01); *H04L 63/20* (2013.01); *H04W 12/02* (2013.01)

(58) Field of Classification Search
CPC ... H04L 63/126; H04L 63/20; G07C 9/00119; G07C 9/00103; H04W 12/02; G06Q 20/382
See application file for complete search history.

(56) References Cited

U.S. PATENT DOCUMENTS

| | | |
|---|---|---|
| 8,930,274 B1 | 1/2015 | Brickell et al. |
| 9,106,647 B2 | 8/2015 | Jain |
| 2010/0182631 A1* | 7/2010 | King ................. G06F 17/243 358/1.15 |
| 2013/0282570 A1 | 10/2013 | Charrat et al. |
| 2014/0040117 A1* | 2/2014 | Jain ................... G06C 20/341 705/39 |
| 2018/0253464 A1* | 9/2018 | Kohli ................. H04L 9/3236 |

\* cited by examiner

*Primary Examiner* — Meng Li
(74) *Attorney, Agent, or Firm* — Sterne, Kessler, Goldstein & Fox P.L.L.C.

(57) ABSTRACT

The present disclosure includes an electronic device for processing a wireless transaction. The electronic device includes a wireless communication interface, a memory, and a processor configured to execute an applet. The wireless communication interface is configured to communicate with a transaction terminal. The memory is configured to store a first set of data for enabling a transaction between the electronic device and the transaction terminal, and a second set of data different from the first set of data. The applet is configured to receive a first request for conducting the transaction. The applet is configured to transmit a first message including or based on the first set of data. The applet is configured to receive a second request for retrieving at least part of the second set of data. The applet is configured to determine whether release of at least part of the second set of data has been authorized.

20 Claims, 8 Drawing Sheets

NON-TRANSACTION ENABLING DATA SECURITY

FIELD

This disclosure generally relates to wireless communications, including wireless transactions.

BACKGROUND

Electronic devices can include wireless capabilities to perform a variety of tasks such as, wirelessly unlocking/locking a computer (or other device), wirelessly interacting with a television or other media device, and wirelessly conducting financial transactions. For financial transactions, the wireless-enabled electronic device may store credentials corresponding to, for example, transmit passes, identification, and credit/debit cards that are compatible with different payment types. For example, using a wireless communication protocol, the electronic device can conduct a transaction with a nearby reader payment terminal using a stored credential that is compatible with the payment terminal. The wireless-enabled electronic device can also store credentials to wirelessly interact with access control gate terminals to gain entry through the gates.

SUMMARY

The present disclosure provides apparatus, method, and computer program product embodiments for protecting privacy of non-transaction enabling data (e.g., transaction history data) stored on an electronic device during wireless transactions.

In some embodiments, an electronic device includes a wireless communication interface, a memory, and a processor configured to execute an applet. The wireless communication interface is configured to communicate with a transaction terminal. The memory is configured to store a first set of transaction enabling data for enabling a transaction between the electronic device and the transaction terminal, and a second set of non-transaction enabling data different from the first set of transaction enabling data. The applet is configured to receive, from the transaction terminal, a first request for conducting the transaction. The applet is configured to, in response to receiving the first request, transmit to the transaction terminal a first message based at least in part on the first set of transaction enabling data. The applet is also configured to receive, from the transaction terminal, a second request for retrieving at least part of the second set of non-transaction enabling data. The applet is further configured to determine whether release of at least part of the second set of non-transaction enabling data has been authorized.

In some embodiments, an electronic device includes a wireless communication interface, a memory, and a processor. The wireless communication interface is configured to communicate with a transaction terminal. The memory is configured to store a first set of transaction enabling data for enabling a transaction between the electronic device and the transaction terminal, and a second set of non-transaction enabling data including at least one open-access data element and at least one controlled-access data element. The processor is configured to select an applet from a plurality of applets based at least in part on a type of the transaction terminal, and execute the applet. The applet is configured to receive, from the transaction terminal, a request for retrieving at least part of the second set of non-transaction enabling data. The applet is configured to determine whether the at least part of the second set of non-transaction enabling data corresponds to the at least one open-access data element or the at least one controlled-access data element. The applet is also configured to, in response to determining that the at least part of the second set of non-transaction enabling data corresponds to the at least one open-access data element, transmit to the transaction terminal a first message based at least in part on the at least one open-access data element. The applet is further configured to, in response to determining that the at least part of the second set of non-transaction enabling data corresponds to the at least one controlled-access data element, request authorization to release the at least one controlled-access data element.

In some embodiments, a method implemented on a wireless-enabled device is disclosed. The method includes receiving, by the wireless-enabled device, a first request for access control from a terminal. The method then includes, in response to receiving the first request, launching an applet on the wireless-enabled device. The method also includes generating, by the applet, a first message based at least in part on a first set of access control data stored on the wireless-enabled device, and transmitting, by the wireless-enabled device, the first message to the terminal. The method further includes receiving, by the wireless-enabled device, a second request for retrieving at least part of a second set of data stored on the wireless-enabled device. The second set of data includes controlled-access data elements of non-transaction enabling data. The method also includes, in response to receiving the second request, initiating an action that calls for authorization relating to the second request.

BRIEF DESCRIPTION OF THE DRAWINGS/FIGURES

Embodiments of the present disclosure will now be described, by way of example only, with reference to the accompanying drawings in which corresponding reference symbols indicate corresponding parts. Further, the accompanying drawings, which are incorporated herein, form part of the specification and illustrate embodiments of the present disclosure.

Figure 1:
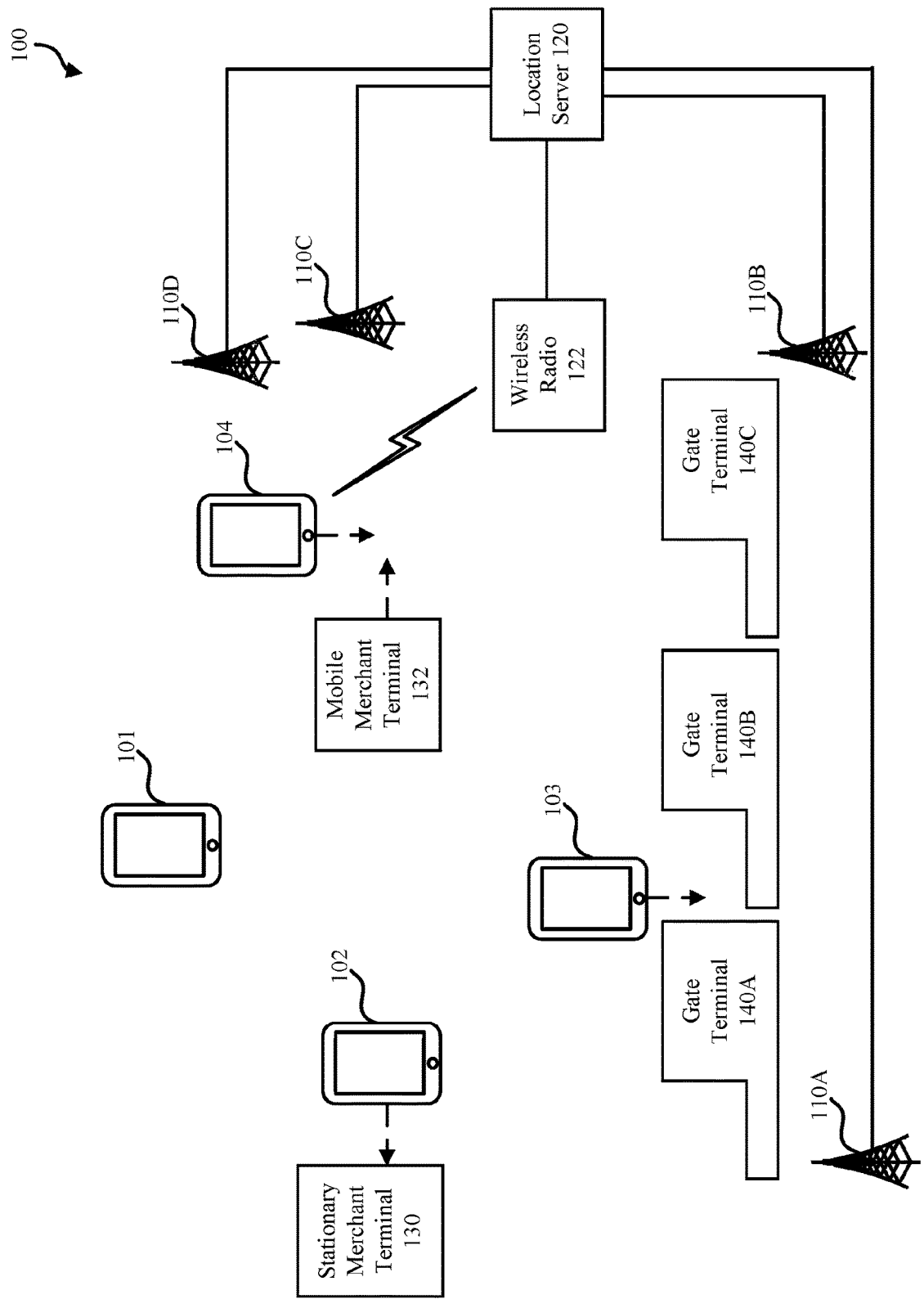
FIG. 1 illustrates an example environment for wirelessly performing electronic transactions, according to some embodiments.

Features and advantages of embodiments of the present disclosure will become more apparent from the detailed description set forth below when taken in conjunction with the drawings. In the drawings, like reference numbers generally indicate identical, functionally similar, and/or structurally similar elements.

DETAILED DESCRIPTION

FIG. 1 illustrates an example environment 100 for wirelessly performing electronic transactions, according to some embodiments. In some embodiments, the transactions may include financial transactions, such as transactions of goods (e.g., grocery shopping at grocery stores) or transactions of services (e.g., taking public transports). In other embodiments, the transactions may include non-financial transactions, for example, gaining entry through access control gates or into secured areas, or gaining access to secured data or services. In still other embodiments, the transactions may include a combination of financial and non-financial transactions.

For purposes of illustration, and not limitation, environment 100 is depicted as a transit station—e.g., train or subway station. Based on the description herein, other types of environments are applicable to the disclosed embodiments, such as but not limited to, retail stores, restaurants, movie theaters, vending machines, mobile point-of-sale (POS) systems, secured locations, secured data repositories, and access control entry points, to name just some examples. These and other types of environments are within the spirit and scope of the present disclosure.

FIG. 1 depicts electronic devices 101-104, a stationary merchant terminal 130, a mobile merchant terminal 132, gate terminals 140A-C, radios 110A-D, and a location server 120. In some embodiments, each of electronic devices 101-104 may be a mobile electronic device such as, for example, a laptop computer, a smart phone, a tablet computer, a wearable device, a laptop computer, a human interface device, etc. Electronic devices 101-104 may be configured to communicate with other electronic devices using various wireless communication protocols, such as Wi-Fi, Bluetooth, radio-frequency identification (RFID), near-field communications (NFC), 60 GHz communications, cellular communication, or any combination thereof. Any or all of electronic devices 101-104 may be equipped with a global positioning system (GPS) radio. In some embodiments, any or all of electronic devices 101-104 may also be equipped with an ultra-wideband (UWB) radio configured to communicate with any or all of radios 110A-D.

Electronic devices 101-104 may perform wireless electronic transactions using one or more credentials (or virtual credentials) associated with a respective electronic device, according to some embodiments. One or more of the credentials can be associated with an account, such as a transit account or a credit/debit account. One or more other credentials can be stored-value (or truth-on-card or actual cash value) credentials that retain an actual financial value on the card, such as a transit card or pre-paid merchant card. In some embodiments, financial information such as credit card information and/or transit card information may be stored on one or more of electronic devices 101-104. In some embodiments, non-financial information such as personal identification information (for example, name, address, and personal identification number (PIN)) may be also or alternatively stored on electronic devices 101-104. This information may be represented as one or more virtual credentials or "virtual cards," for example, "virtual payment cards" or "virtual access cards," stored in electronic devices 101-104—analogous to physical cards or access cards in a wallet—and used by electronic devices 101-104 to conduct electronic (e.g., financial and/or non-financial) transactions. Electronic device 101-104 may use any number of wireless communication means to perform transactions, including with any or all of stationary merchant terminal 130, mobile merchant terminal 132, and/or gate terminals 140A-C.

In referring to FIG. 1, each of stationary merchant terminal 130 and mobile merchant terminal 132 may be, for example, an Europay, MasterCard, Visa (EMV) terminal associated with one or more merchants, according to some embodiments. In other embodiments, one or more other types of terminals may be used. Gate terminals 140A-C may be transit gate terminals, such as turnstiles, which serve as gatekeepers into, for example, a transit platform area (e.g., platform area for a train or subway). In some embodiments, gate terminals 140A-C may include access control gate terminals that serve as gatekeepers of a controlled area (e.g., subway staff office). Stationary merchant terminal 130, mobile merchant terminal 132, and gate terminals 140A-C may be equipped with hardware to enable wireless communication with electronic devices 101-104 based on, for example, an NFC protocol, according to some embodiments. Further, any/all of radios 110A-D can be a UWB radio.

FIG. 1 depicts different example scenarios in which one or more of electronic devices 101-104 perform transactions with one or more of stationary merchant terminal 130, mobile merchant terminal 132, and/or gate terminals 140A-C. As depicted in the example of FIG. 1, electronic device 101 may be outside the range of stationary merchant terminal 130, mobile merchant terminal 132, and gate terminals 140A-C such that electronic device 101 cannot perform a transaction with any of these terminals. Electronic device 102 may be near stationary merchant terminal 130. Electronic device 104 and mobile merchant terminal 132 (e.g., a mobile POS system) may move towards each other to perform a transaction via, for example, an NFC connection. Electronic device 103 may be near gate terminal 140B, in which electronic device 103 (and associated user) may seek to enter the transit platform through gate terminal 140B (e.g., a transit gate terminal). In some embodiments, electronic devices 102-104 may use different virtual payment cards (or other credentials) to perform transactions with their corresponding nearby payment terminals. For example, electronic devices 102 and 104 may use virtual payment cards associated with different banks or merchants to perform transactions with stationary merchant terminal 130 and mobile merchant terminal 132, respectively. Electronic device 103 may use a virtual prepaid "smart card" that is compatible with gate terminal 140B. In some embodiments, a subway staff may use a virtual access card ("virtual badge") in electronic device 103 to gain entry to the staff office through gate terminal 140C (e.g., an access control gate terminal). In other implementations, any credential compatible with a merchant system may be used for a transaction.

In some embodiments, electronic devices 102-104 may automatically select an appropriate credential (e.g., virtual card) based on their distance from (or proximity to) their respective transaction terminals and their knowledge of the type of the transaction terminals. The distance between electronic devices 102-104 and their respective transaction terminals may be determined using radios 110A-D, which can be UWB radios according to some embodiments (radios 110A-D are also referred to herein as "UWB radios 110A-D"). In some embodiments, UWB radios 110A-D may be communicatively connected to location server 120.

In some embodiments, electronic devices 101-104 may engage in a "ranging" operation (or alternatively "secure ranging" operation) with UWB radios 110A-D. In some embodiments, the ranging operation allows UWB radios 110A-D to determine the distance between UWB radios 110A-D and an electronic device, such as any or all of electronic devices 101-104. In some embodiments, one or more of UWB radios 110A-D may determine their respective distances from electronic device 104 and provide the respective distances to location server 120. Location server 120 may use a triangulation (or trilateration) method to determine a location of electronic device 104 within environment 100, according to some embodiments. Location server 120 may communicate the relative location to electronic device 104 via a wireless radio 122. It is to be appreciate that wireless radio 122 may be configured to communicate the location to electronic device 104 using any wireless protocol, such as any or all of Wi-Fi, Bluetooth, or a cellular communication standard (e.g., UMTS, CDMA, or LTE standards). In some embodiments, wireless radio 122 may utilize "small cell" or "distributed antennae system" deployments to allow location server 120 to communicate with electronic devices 101-104 throughout environment 100. Alternatively, in some embodiments, any or all of UWB radios 110A-D can be used by location server 120 to communicate the relative location to electronic device 104.

If a transaction terminal is stationary (e.g., stationary merchant terminal 130 or any one of gate terminals 140A-C), either one or more of electronic devices 101-104 or location server 120 may determine the distance between the electronic device and transaction terminal, according to some embodiments. In some embodiments, if a transaction terminal is mobile (e.g., mobile merchant terminal 132), the mobile terminal may perform ranging operations with one or more UWB radios 110A-D to determine the mobile terminal's relative location within environment 100. Location server 120 can send the mobile transaction terminal's location to electronic devices 101-104, according to some embodiments. Any one of electronic devices 101-104 may determine the relative distance between itself and the mobile terminal based on the mobile transaction terminal's location. Alternatively, in some embodiments, location server 120 can determine the relative distance between an electronic device, such as any or all of electronic devices 101-104, and the mobile transaction terminal and send this relative distance information to any or all of electronic devices 101-104.

Once an electronic device determines it is near a transaction terminal, based on ranging operations with one or more of UWB radios 110A-D and communication with location server 120 via wireless radio 122, the electronic device may select the appropriate credential (e.g., virtual card) that is compatible with the transaction terminal. If the user of the electronic device wishes to engage in a transaction, the electronic device may be placed near the transaction terminal to initiate a transaction via, for example, NFC. In some embodiments, the electronic device may require an additional authentication measure—such as, for example, a PIN or biometric reading (input) such as a fingerprint, a facial image, a voice sample, a voice command, a swipe across the screen of the electronic device, etc.—to authorize and/or complete the transaction with the transaction terminal. In some embodiments, the electronic device may not require additional authentication measures, and the transaction may be completed by "hovering" the electronic device near the transaction terminal (e.g., within a sufficiently close distance to perform an NFC connection).

In some embodiments, the user of an electronic device may manually select the appropriate credential (e.g., virtual card) stored in the electronic device based on the type of the nearby transaction terminal for performing a transaction. For example, when the user enters a subway station, the user may manually select the corresponding virtual transit card used in the city's subway system. When the user wants to purchase a drink from a vending machine in the subway station, the user may manually select another virtual payment card for purchase. When the user leaves the subway station and enters an office building, the user may manually select a virtual access card, e.g., a virtual employee badge, to gain entry to the office area. That is, depending on the user's current location (e.g., the country and city), the current transaction type (e.g., financial transaction or non-financial transaction), and the nearby transaction terminals (e.g., merchant terminals, transit gate terminals, or access control gate terminals), the user of the electronic device may switch between the credentials (e.g., virtual cards) stored in the electronic device to perform transactions with the transaction terminals.

In some embodiments, in order to conduct transactions with transaction terminals, transaction enabling data may be stored in an electronic device. For example, for financial transactions, the transaction enabling data may include any/all of, but are not limited to, the expiration date of the virtual card, status of the virtual card (e.g., active, suspended, blacklisted, etc.), type of the virtual card (e.g., city A's transit card, merchant B's prepaid merchant card, building C's access card, etc.), encryption information of the virtual card for authentication/authorization, remaining balance on the virtual card, credit limit of the virtual card, initial or preset value of the virtual card, etc. For example, the expiration date, status, type, and encryption information of a virtual transit card may be needed for validating the virtual transit card and activating a transaction between electronic device 103 and gate terminal 140B when the user of electronic device 103 enters or leaves a subway station. The remaining balance on the virtual transit card may be needed for completing the transaction between electronic device 103 and gate terminal 140B since gate terminal 140B needs to determine whether there is enough balance and to deduct the appropriate fare from the balance on the virtual transit card on electronic device 103. Both data for activating the transaction (e.g., validating the virtual card) and data for completing the transaction (e.g., withdrawing money from the virtual card) may be considered as transaction enabling data as they are necessary for enabling the transaction.

It is to be appreciated that, depending on the types of the transactions, the types of data considered as the transaction enabling data may vary in some embodiments. For example, for a virtual access card needed to access a controlled area, the balance, credit limit, or any other financial data stored in an electronic device may not be considered as transaction enabling data for the virtual access card because the financial data is not needed for transactions between an electronic device and an access control gate terminal when the user of the electronic device wishes to enter the controlled area using the virtual access card in the electronic device. In any event, a transaction terminal is usually allowed to retrieve (or otherwise access) transaction enabling data in order to activate and/or complete the transaction, subject to any necessary authentication and/or authorization protocols.

On the other hand, additional data that is different from transaction enabling data, but associated with transactions between an electronic device and a transaction terminal, may be stored in the electronic device as well. This type of data may be considered as non-transaction enabling data, including but not limited to, transaction history data (e.g., reflecting the usage history of the virtual card) and personal identification information. In some embodiments, the transaction history data may include details of past transactions made by the virtual card within a certain time frame (e.g., the past month or year) or up to a certain number of past transactions (e.g., the last 10 or 100 transactions). In some embodiments, the personal identification information may include any/all of the name, address, gender, birth date, age, social security number, marital status, email addresses, etc. of the user, or any other information about or related to the user that the user may not wish to reveal to the transaction terminals during wireless transactions, and which may not be necessary for enabling the transactions. It is to be appreciated that, depending on the types of the transactions, the types of data considered as non-transaction enabling data may vary in some embodiments. For example, certain personal identification information (e.g., name) may be considered as non-transaction enabling data for financial transactions using virtual payment cards in some cases, but may be considered as transaction enabling data for access control (e.g., entering a company building) using virtual access cards.

Accordingly, non-transaction enabling data often relates to the privacy of the users, and any unauthorized release of non-transaction enabling data to transaction terminals may cause security and privacy concerns to users of electronic devices. Also, in contrast to transaction enabling data, which usually requires authentication and/or authorization protocols for access, non-transaction enabling data may not be subject to the same level of protection during transactions with conventional wireless transaction systems. Thus, a benefit, among others, of the electronic devices and methods disclosed herein includes protecting the users of electronic devices from unauthorized release of non-transaction enabling data to transaction terminals during wireless transactions, thereby improving data security and better protecting the users' privacy information. In some embodiments, for at least some non-transaction enabling data (e.g., controlled-access data elements), user attention is needed (e.g., explicit user authorization and/or notification to the users) to access such non-transaction enabling data during wireless transactions. In some embodiments, for certain limited non-transaction enabling data (e.g., open-access data elements), which have less security and privacy concerns and/or can be frequently accessed by some transaction terminals, a lower level of protection or no protection (e.g., involving less or no user attention) is needed to access such data, to thereby improve user experience.

Figure 2:
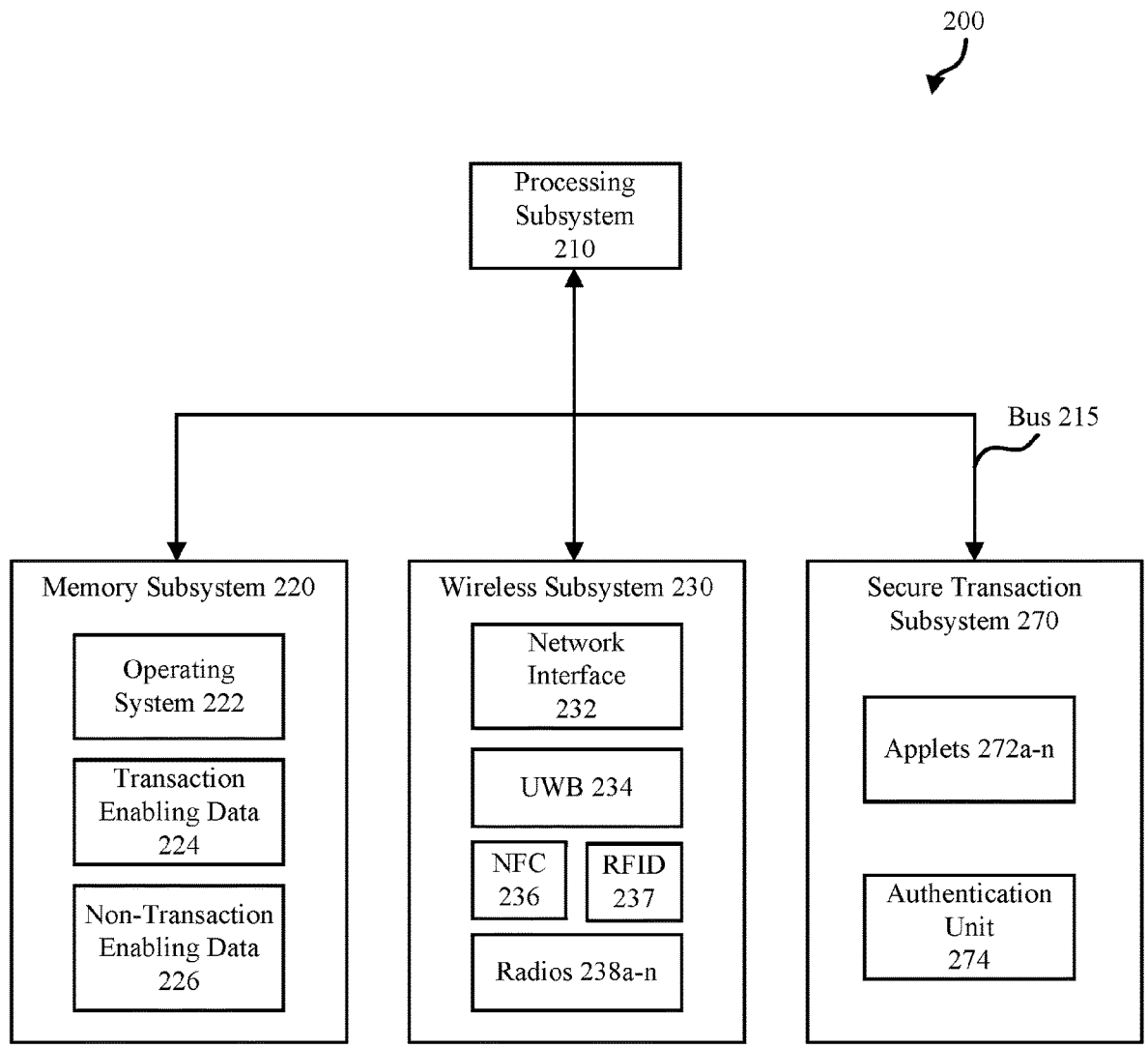
FIG. 2 illustrates an example electronic device, according to some embodiments.

FIG. 2 illustrates a block diagram of an example electronic device 200, according to some embodiments. Electronic device 200 may be an embodiment of electronic devices 101-104 of FIG. 1. The components of electronic device 200 depicted in FIG. 2 are not limiting and are intended to illustrate an example configuration appropriate to achieve the systems and methods of some embodiments of the present disclosure.

Electronic device 200 may be implemented as a stand-alone or a discrete device or may be incorporated within or coupled to another electronic device or host device such as a mobile phone, a smart watch, a wearable device, a portable computing device, a camera, or a GPS unit or another computing device such as a personal digital assistant, a video gaming device, a laptop, a tablet, or any other suitable electronic device that will be apparent to those skilled in the relevant art(s) without departing from the spirit and scope of the present disclosure.

Electronic device 200 may include a processing subsystem 210, a memory subsystem 220, a wireless subsystem 230, and a secure transaction subsystem 270. Processing subsystem 210, memory subsystem 220, wireless subsystem 230, and secure transaction subsystem 270 are communicatively connected by a bus 215. Bus 215 may be an electrical, optical, or electro-optical connection that the subsystems can use to communicate commands and data among one another. Electronic device 200 may have more than one electrical, optical, or electro-optical connection among the subsystems without departing from the spirit and scope of the present disclosure.

Processing subsystem 210 may include one or more devices that perform computational operations. For example, processing subsystem 210 can include one or more processors, such as, for example, one or more microprocessors, application-specific integrated circuits (ASICs), microcontrollers, and/or programmable-logic devices. Processing subsystem 210 may launch an operating system 222 (stored in memory subsystem 220) that includes procedures (or a set of instructions) for handling various system services to perform, for example, hardware-dependent tasks.

Processing subsystem 210 may also launch one or more applets 272a-n in secure transaction subsystem 270, for example, by loading applet 272 into memory subsystem 220 for execution. Each applet 272 may be configured to act as a credential (e.g., a virtual card), such as a virtual payment card, such as a transit card or a merchant card, and a virtual access card. That is, the functions of a credential (e.g., a virtual card) for performing wireless transactions with a transaction terminal as disclosed herein may be implemented by executing a corresponding applet 272 by processing subsystem 210. Applet 272 may be any application that performs tasks related to wireless transactions in operating system 222 of electronic device 200. In some embodiments, applet 272 may be configured to read and/or write transaction enabling data 224 and/or non-transaction enabling data 226 in memory subsystem 220 in order to perform the tasks related to wireless transactions. While shown in memory subsystem 220 in the example of FIG. 2, transaction enabling data 224 and/or non-transaction enabling data 226 may reside in secure transaction subsystem 270 or be otherwise secured in electronic device 200.

In some embodiments, applet 272 may be configured to receive requests from a corresponding transaction terminal for conducting a transaction. The request may include one or more commands, for example, for validating the credential (e.g., virtual card) associated with applet 272 and retrieving and/or changing the remaining balance on the virtual card. As these commands relate to the retrieval of transaction enabling data 224, applet 272 may follow standard authorization and/or authentication protocols, for example, by an authentication unit 274 in secure transaction subsystem 270, and transmit one or more return messages to the transaction terminal based on related transaction enabling data 224 in order to enable the transaction.

If the transaction terminal requests at least part of non-transaction enabling data 226, for example, transaction history data or personal identification data associated with the credential (e.g., virtual card), applet 272 may be configured to initiate one or more actions that call for attention from the user of electronic device 200. In some embodiments, the actions may include issuing a notification to the user about the request, for example, by popping-up a message on the display screen of electronic device 200 and/or making a warning sound to draw the user's attention. In some embodiments, the actions may include requesting explicit authorization from the user to allow the transaction terminal to retrieve the requested non-transaction enabling data 226 and transmitting the requested non-transaction enabling data 226 only after receiving the user's authorization. In some embodiments, upon receiving the user's authorization and/or after issuing the notification to the user, applet 272 may be configured to transmit a return message to the transaction terminal based on the requested non-transaction enabling data 226. In some embodiments, if the user denies the authorization to release non-transaction enabling data 226, applet 272 may be configured to prevent the transaction terminal from retrieving the requested non-transaction enabling data 226.

In some embodiments, if an explicit user authorization is needed to release the requested non-transaction enabling data 226, applet 272 may make the current transaction fail and then request the user to authorize the release of the requested non-transaction enabling data 226 in the next transaction. The user then may be asked to repeat the transaction by presenting electronic device 200 again to the transaction terminal. In other words, user authorization may be achieved in the same transaction or in a subsequent transaction.

Figure 3:
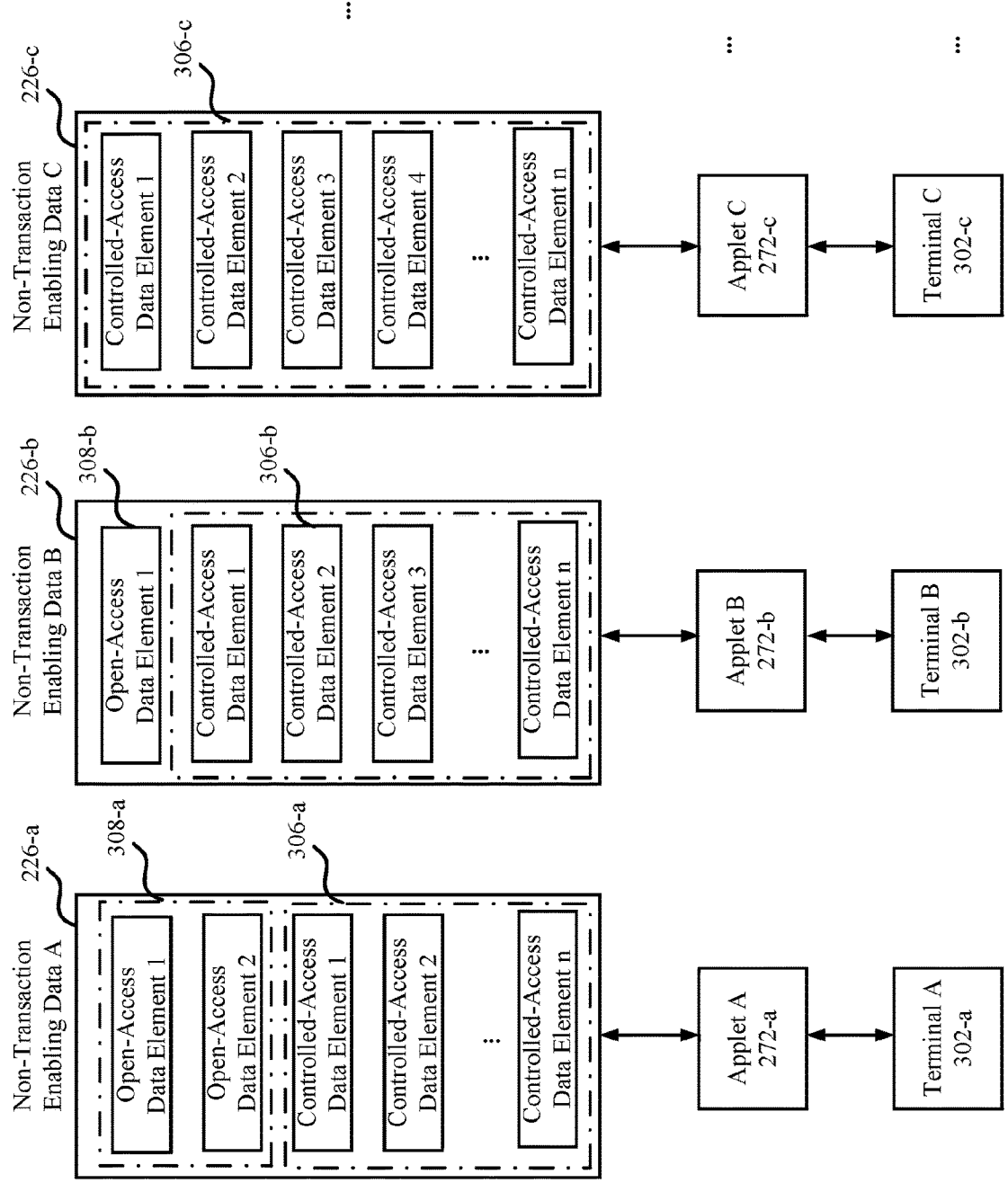
FIG. 3 illustrates a block diagram of example structures of non-transaction enabling data, according to some embodiments.

In some embodiments, non-transaction enabling data 226 may include open-access data elements and/or controlled-access data elements. FIG. 3 illustrates a block diagram of possible structures and organizations of non-transaction enabling data 226, according to some embodiments. As shown in FIG. 3, non-transaction enabling data 226 may include multiple sets of non-transaction enabling data A-C 226a-c, each of which is associated with a corresponding one of applets A-C 272a-c. Applets A-C 272a-c may interact with a corresponding one of transaction terminals A-C 302a-c for performing wireless transactions. Once a transaction terminal 302 requests any part of non-transaction enabling data 226 during a transaction, the corresponding applet 272 then serves as a gatekeeper to decide how to handle the request, for example, based on at least the type of the requested data elements in non-transaction enabling data 226.

In some embodiments, non-transaction enabling data A 226a may include two open-access data elements 308a, and the rest of data elements may be controlled-access data elements 306a. Open-access data elements 308a may include, for example, recent transactions conducted by electronic device 200 using applet A 272a. For example, applet A 272a may act as a virtual transit card for subway system of city A, and open-access data elements 308a may be the last two subway transaction records (e.g., the last two subway stations that the user entered or left) since the subway system of city A requires this data for calculating the train fare. Controlled-access data elements 306a on the other hand, may be old subway transaction records that are not necessary for fare calculation. Applet A 272a may be configured to determine whether transaction terminal A 302a requests access to open-access data elements 308a, or to controlled-access data elements 306a.

If transaction terminal A 302a requests access to open-access data elements 308a, applet A 272a may be configured to transmit a return message to transaction terminal A 302a containing open-access data elements 308a without requesting authorization from the user. This is the case, because open-access data elements 308a are required for fare calculation and have a low level of security and privacy concerns for the user. In some embodiments, applet A 272a may be configured to issue a notification to the user to inform the user that open-access data elements 308a, e.g., the last two subway visits, have been transmitted to transaction terminal A 302a per its request. In some embodiments, open-access data elements 308a may be the most recent history record so that the terminal can calculate possible discounts, such as park & ride, where the parking terminal would check that the last transaction was a metro exit nearby and grant a specific daily flat rate instead of hourly charging.

On the other hand, if transaction terminal A 302a requests access to controlled-access data elements 306a, applet A 272a may be configured to request authorization from the user before allowing transaction terminal A 302a to retrieve such controlled-access data elements 306a. If applet A 272a receives the authorization from the user, then it may be configured to transmit a return message to transaction terminal A 302a containing the requested controlled-access data elements 306a. Otherwise, applet A 272a may be configured to refuse transmitting the requested controlled-access data elements 306a to transaction terminal A 302a.

It is to be appreciated that the number of open-access data elements 308 is not limited and may vary depending on the associated applet 272 (and corresponding virtual card and transaction terminal 302). In some embodiments, non-transaction enabling data B 226b may include one open-access data element 308b. The associated applet B 272b may act as a virtual access card, and open-access data element 308b may be the personal identification information, e.g., the employer of the user, which may be needed by transaction terminal B 302b (e.g., an access control gate terminal) for displaying it on the display screen to security guards. Controlled-access data elements 306b in non-transaction enabling data B 226b may include past entry/exit records (usage history of applet B 272b), which may not be needed in normal situations.

Similar to applet A 272a described above, applet B 272b may be configured to determine whether a request from transaction terminal B 302b for retrieving non-transaction enabling data B 226b is for open-access data element 308b or controlled-access data elements 306b. Based on the determination, different actions may be initiated by applet B 272b to handle the request. For example, applet B 272b may be configured to transmit a return message including open-access data element 308b to transaction terminal B 302b without user authorization, or transmit a return message including controlled-access data elements 306b to transaction terminal B 302b upon receiving user authorization.

In some embodiments, non-transaction enabling data C 226c may not include any open-access data element 308, and all data elements in non-transaction enabling data C 226c may be controlled-access data elements 306c. For example, applet C 272c associated with non-transaction enabling data C 226c may act as a virtual merchant card that is used to make purchases at retail stores. Non-transaction enabling data C 226c, such as the purchase history data and personal identification data, may all be controlled-access data elements 306c that cannot be released to transaction terminal C 302c without prior user authorization.

Referring back to FIG. 2, memory subsystem 220 may include one or more devices or modules for storing data and/or instructions for processing subsystem 210 and wireless subsystem 230. For example, memory subsystem 220 can include memory, such as, for example, dynamic random access memory (DRAM), static random access memory (SRAM), and/or other types of memory. More generally, memory subsystem 220 may include volatile memory and/or non-volatile memory that are configured to store information. In addition, memory subsystem 220 can include mechanisms (such as instructions or modules) for controlling access to the memory. In some embodiments, memory subsystem 220 includes a memory hierarchy that includes one or more caches coupled to a memory in electronic device 200. Additionally or alternatively, one or more of the caches may be located in processing subsystem 210.

Wireless subsystem 230 may be a wireless communication interface including processors, controllers, radios/antennas, sockets/plugs, and/or other devices for engaging in wireless communication with another wireless communication device—e.g., communicating packets or frames with another device (e.g., a transaction terminal) via a wireless communication link (e.g., a NFC link). In some embodiments, wireless subsystem 230 may include a network interface 232, an ultra-wideband (UWB) radio 234, a radiofrequency identification (RFID) radio 237, a NFC radio 236, and radios 238*a-n* (e.g., Wi-Fi, Bluetooth, 60 GHz communications, cellular communications radios, and/or combinations thereof). Network interface 232 receives signals from UWB radio 234, NFC radio 236, RFID radio 237, and/or wireless radios 238*a-n* and processes these signals for use by other subsystems of electronic device 200. The signals received by radios 238*a-n* may be, for example, a Wi-Fi signal from a nearby Wi-Fi access point or a cellular telecommunications signal using, for example, any one of UMTS, LTE, or WiMAX protocols. Wireless subsystem 230 enables electronic device 200 to, for example: (i) send and receive UWB signals via UWB radio 234, (ii) detect contactless interactions with transaction terminals via NFC radio 236 and RFID radio 237, and (iii) communicate with other wireless communication devices via a wireless communication protocol such as, for example, Wi-Fi, Bluetooth, and/or a cellular communication protocol.

Secure transaction subsystem 270 includes processors and memory that may be separate from processing subsystem 210 and memory subsystem 220. Secure transaction subsystem 270 may be a tamper-resistant environment in electronic device 200 to provide secure transactions involving one or more credentials (e.g., virtual cards) stored in electronic device 200. In some embodiments, secure transaction subsystem 270 stores one or more virtual cards or other credentials. Further, secure transaction subsystem 270 may store associated account information for one or more credentials (e.g., virtual cards). In particular, in some embodiments, secure transaction subsystem 270 may include applets 272*a-n* that act as credentials (e.g., virtual cards). Applets 272*a-n* may mimic the protocol requirements of various contactless credential such as, for example, (i) EMV cards, (ii) "Felicity Card" (FeliCa) cards, (iii) closed loop transit cards based on "Mifare Plus," "Mifare DESFire," "Calypso," or MoC, (iv) MoT standards ("Ministry of Construction" and "Ministry of Transport" of China), and/or (v) other payment card implementations. Smart cards that mimic the function of transit cards may also be represented by one or more of applets 272*a-n*, according to some embodiments. Different metropolitan cards may operate on different proprietary systems based on, for example, NFC or RFID technology. These different metropolitan cards may include Bay Area Rapid Transit (BART) "Clipper" cards (California, USA), "SmarTrip" (District of Columbia, USA), "the Chicago Card" (Illinois, USA), "SmartLink" (New York, USA), "Suica"/"Pasmo"/"Setamaru" (Tokyo, Japan), "SPTC" (Shanghai, China), "Navigo" (Paris, France), and so on.

In some embodiments, secure transaction subsystem 270 may also include authentication unit 274. Authentication unit 274 may store instructions and identifier information for performing authentication functions for applets 272*a-n*. The identifier information may include biometric information, alphanumeric passcodes such as a PIN, and various other measures that may be required to use one or more applets 272*a-n*. When a particular credential is used and a transaction is attempted, authentication unit 274 may be executed to gather the required identification information from, for example, a user of electronic device 200.

As noted above, transaction enabling data 224 and/or non-transaction enabling data 226 may also be stored in secure transaction subsystem 270, or otherwise secured in electronic device 200.

During a transaction, secure transaction subsystem 270 may interact with any or all of wireless subsystem 230, processing subsystem 210, and memory subsystem 220. For example, when electronic device 200 approaches a transaction terminal, processing subsystem 210 may send a signal to secure transaction subsystem 270 to indicate that electronic device 200 is approaching a transaction terminal of some type. Secure transaction subsystem 270 may select an appropriate applet 272 from applets 272*a-n*. If a transaction is initiated by the user, such as by "hovering" electronic device 200 near the transaction terminal or otherwise presenting or introducing electronic device 200 into a field of the terminal, secure transaction subsystem 270 executes instructions to perform the transaction using the appropriate applet 272. The transaction initiation may be detected by NFC radio 236 or RFID radio 237 of wireless subsystem 230, which sends a signal to secure transaction subsystem 270 to indicate that a transaction is being attempted. In some embodiments, authentication unit 274 of secure transaction subsystem 270 may execute authentication instructions. Further, in some embodiments, secure transaction subsystem 270 may debit or otherwise update an account associated with the selected applet 272 (and associated virtual card), according to some embodiments.

In some embodiments, electronic device 200 may include one or more additional processing subsystems 210, memory subsystems 220, wireless subsystems 230, and/or secure transaction subsystems 270. Additionally, it may be possible for one or more of these subsystems to be omitted from electronic device 200. Moreover, electronic device 200 may include one or more additional subsystems that are not shown in FIG. 2. For example, electronic device 200 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 2, some or all of the above-described subsystems can be integrated into one or more of the other subsystems in electronic device 200 without departing from the spirit and scope of the present disclosure.

Figure 4:
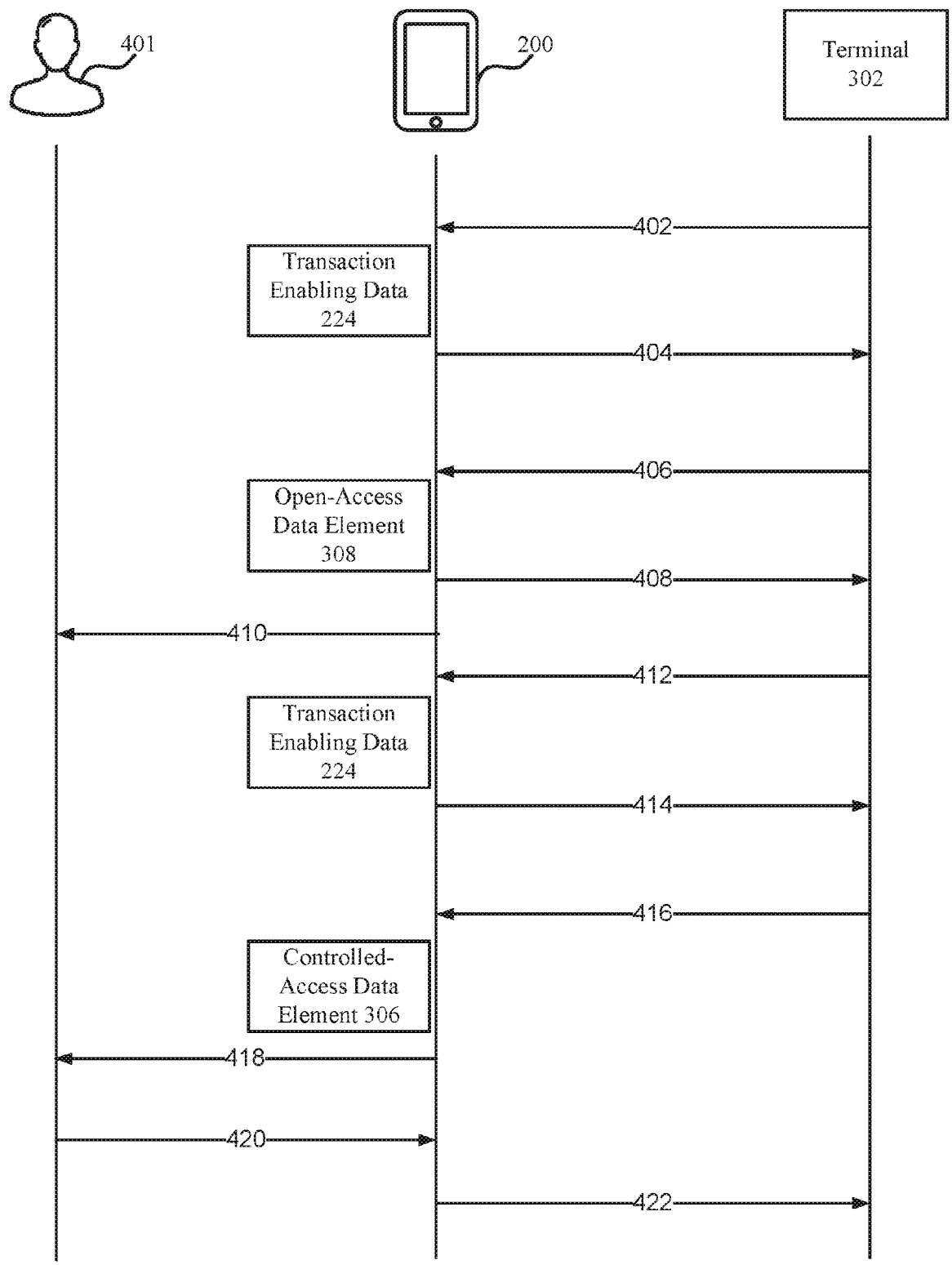
FIG. 4 illustrates an example signaling flow for processing wireless transactions, according to some embodiments.

FIG. 4 illustrates an example signaling flow for processing wireless transactions, according to some embodiments. In particular, the signaling flow in FIG. 4 depicts an exemplary messaging communication between electronic device 200, terminal 302, and a user 401 of electronic device 200. Electronic device 200 may be an example of electronic devices 101-104 in FIG. 1, and terminal 302 may be an example of terminals 130, 132, and 140A-C in FIG. 1.

At 402, when electronic device 200 approaches terminal 302, and/or vice versa, terminal 302 may transmit a command to electronic device 200 to initiate a transaction between an appropriate credential (e.g., virtual card, implemented as an applet on electronic device 200) and terminal 302. The command may include identification information of terminal 302, such as the type of terminal 302, and a request for validation information of the virtual card from electronic device 200. The validation information may include the status, expiration date, and/or encryption information of the credential (e.g., virtual card). It is noted that, in some embodiments, the transaction may be instead initiated by one or more messages from electronic device 200 to terminal 302, prior to the transmission of the command from the terminal 302 to the electronic device 200 in 402.

Upon receiving the command from terminal 302, processing subsystem 210 and/or secure transaction subsystem 270 of electronic device 200 may select an appropriate applet 272 from applets 272*a-n* based on the type of terminal 302 identified in the command transmitted at 402. Electronic device 200 then may execute applet 272 to retrieve the requested validation information from transaction enabling data 224 stored in memory subsystem 220. At 404, electronic device 200 may transmit a return message that includes or is based on the retrieved validation information of the virtual card associated with the selected applet 272.

Upon receiving the return message with the requested validation information of the virtual card, terminal 302 may validate the credential (e.g., virtual card) of electronic device 200. Once the credential (e.g., virtual card) is validated, in some embodiments, for example, when terminal 302 is a gate terminal, at 406, terminal 302 may transmit a command to electronic device 200 requesting for retrieving one or more open-access data elements 308 that are part of non-transaction enabling data 226. In an example, terminal 302 may be a transmit gate terminal that requests the last one or several transit usage records, in order to calculate the fare. In another example, terminal 302 may be an access control gate terminal that requires the name of user 401 of electronic device 200. In any event, the request from terminal 302 transmitted at 406 may be directed to open-access data element 308 that is considered to have less or no security or privacy concerns.

Upon receiving the command from terminal 302, applet 272 of electronic device 200 may retrieve the requested open-access data elements 308 and transmit, at 408, a return message based on the requested open-access data elements 308 to terminal 302. In some embodiments, no user authorization is needed for releasing open-access data elements 308 to terminal 302 at 408. It is to be appreciated that open-access data elements 308 may be specific to corresponding terminal 302 and applet 272. For example, the last one or several transit usage records may be open-access data elements for a transit gate terminal that is the same type of transmit gate terminals that created those records (e.g., belonging to the subway system of the same city), but may not be open-access data elements for another transit gate terminal belonging to a different subway system or may not be open-access data elements for merchant terminals. Thus, if other terminals request transit usage records, electronic device 200 may treat the request as directing to controlled-access data elements, which require user authorization before releasing the data.

In some embodiments, at 410, electronic device 200 may issue a notification to user 401 regarding the release of open-access data elements 308 to terminal 302 so that user 401 becomes aware of the request from terminal 302. Thus, if for some reasons user 401 has concerns on releasing the requested open-access date elements 308 to terminal 302, user 401 may take actions to prevent future release of the same type of data.

In some embodiments, at 412, terminal 302 may transmit a command for completing the transaction, such as requesting the remaining balance on the virtual card of electronic device 200. As described above, the data needed for completing the transaction is part of transaction enabling data 224 stored in electronic device 200.

Upon receiving the command from terminal 302, at 414, applet 272 of electronic device 200 may transmit a return message based on the requested transaction enabling data 224, such as the remaining balance on the virtual card before and after the transaction, to terminal 302. It is to be appreciated that in some embodiments, additional signals may be exchanged between terminal 302 and electronic device 200 to complete the transaction, such as but not limited, updating the balance on the virtual card, and authenticating and/or authorizing the transaction.

At 416, which may occur at an earlier point in the signaling example of FIG. 4, terminal 302 may transmit a command for requesting additional information from electronic device 200 that involves controlled-access data elements 306 associated with applet 272. For example, a merchant terminal may ask for the purchase history of the virtual merchant card, and a transit gate terminal may ask for the old transit history of the virtual transit card (e.g., in the past month). This type of information may not be necessary for enabling the transaction and presumably may have high level of security and privacy concerns to user 401.

At 418, upon receiving the command from terminal 302, applet 272 of electronic device 200 may request user 401 to authorize the release of the requested controlled-access data elements 306. At 420, user 401 may provide an input to electronic device 200 indicating whether the request is authorized. At 422, applet 272 of electronic device 200 may transmit a return message to terminal 302 depending on the input received from user 401 at 420. If user 401 authorizes the release of the requested controlled-access data elements 306, then the return message at 422 may include the requested controlled-access data elements 306. Otherwise, the return message may deny the release of the data to terminal 302. In some embodiments, 422 may be omitted, and electronic device 200 may not take any further action if user 401 does not authorize the release of the requested controlled-access data elements 306.

Figure 5:
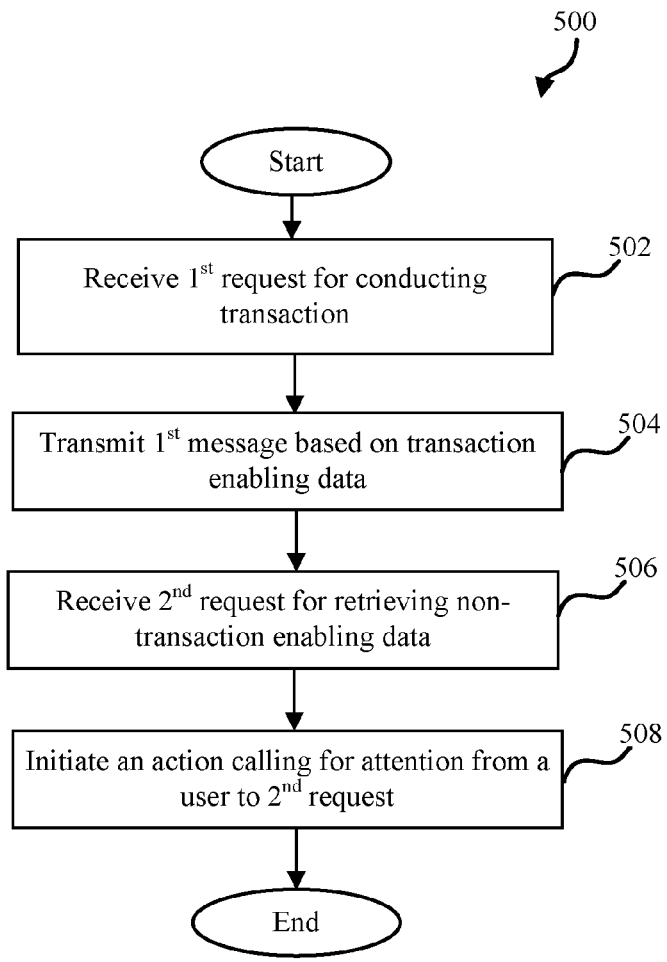
FIG. 5 illustrates an example flowchart for processing wireless transactions, according to some embodiments.

FIG. 5 illustrates an example flowchart 500 for processing wireless transactions, according to some embodiments. The operations depicted in flowchart 500 may be performed by an electronic device, such as any or all of electronic devices 101-104 of FIG. 1 and electronic device 200 of FIG. 2. It is to be appreciated that not all operations may be needed to perform the disclosure provided herein. Further, some of the operations may be performed simultaneously, or in a different order than shown in FIG. 5.

At 502, a first request for conducting a transaction between a transaction terminal and an electronic device may be received by the electronic device from the transaction terminal. In some embodiments, the transaction may be a financial transaction between a merchant terminal 130, 132 or a transit gate terminal 140B and electronic device 102, 103. In some embodiments, the transaction may be a non-financial transaction, e.g., between an access control gate terminal 140C and electronic device 103. In some embodiments, the request may include one or more commands transmitted from transaction terminal 302 to electronic device 200 for requesting transaction enabling data 224, such as validation data for activating the transaction and financial data for completing the transaction. In some embodiments, electronic device 200 may launch and execute applet 272 corresponding to transaction terminal 302 for handling the transaction.

At 504, a first message including or based on the transaction enabling data may be transmitted to the transaction terminal in response to receiving the first request. In some embodiments, applet 272 of electronic device 200 may retrieve the requested transaction enabling data 224 and transmit the first message to transaction terminal 302 including the requested transaction enabling data 224. In some embodiments, applet 272 of electronic device 200 may transmit multiple messages including different types of transaction enabling data 224 in response to the multiple commands transmitted by transaction terminal 302 for performing the transaction.

At 506, a second request for retrieving non-transaction enabling data may be received by the electronic device from the transaction terminal. Non-transaction enabling data may include transaction history data and personal identification data. In some embodiments, applet 272 of electronic device 200 may receive the second request for retrieving non-transaction enabling data 226.

At 508, an action calling for attention from the electronic device user to the second request may be initiated by the electronic device. In some embodiments, applet 272 of electronic device 200 may initiate one or more actions based on the specific type of non-transaction enabling data 226 requested by transaction terminal 302. Non-transaction enabling data 226 may include open-access data elements 308 and controlled-access data elements 306. In some embodiments, if the second request is directed to controlled-access data elements 306, applet 272 may request authorization from user 401 in order to retrieve (or release) the requested controlled-access data elements 306. In some embodiments, if the second request is directed to open-access data elements 308, applet 272 may transmit a second message to transaction terminal 302 including or based on the requested open-access data elements 308 without requesting prior authorization from user 401. In some embodiments, applet 272 may also issue a notification to user 401 about transmitting the second message to transaction terminal 302 with the requested open-access data elements 308.

Figure 6:
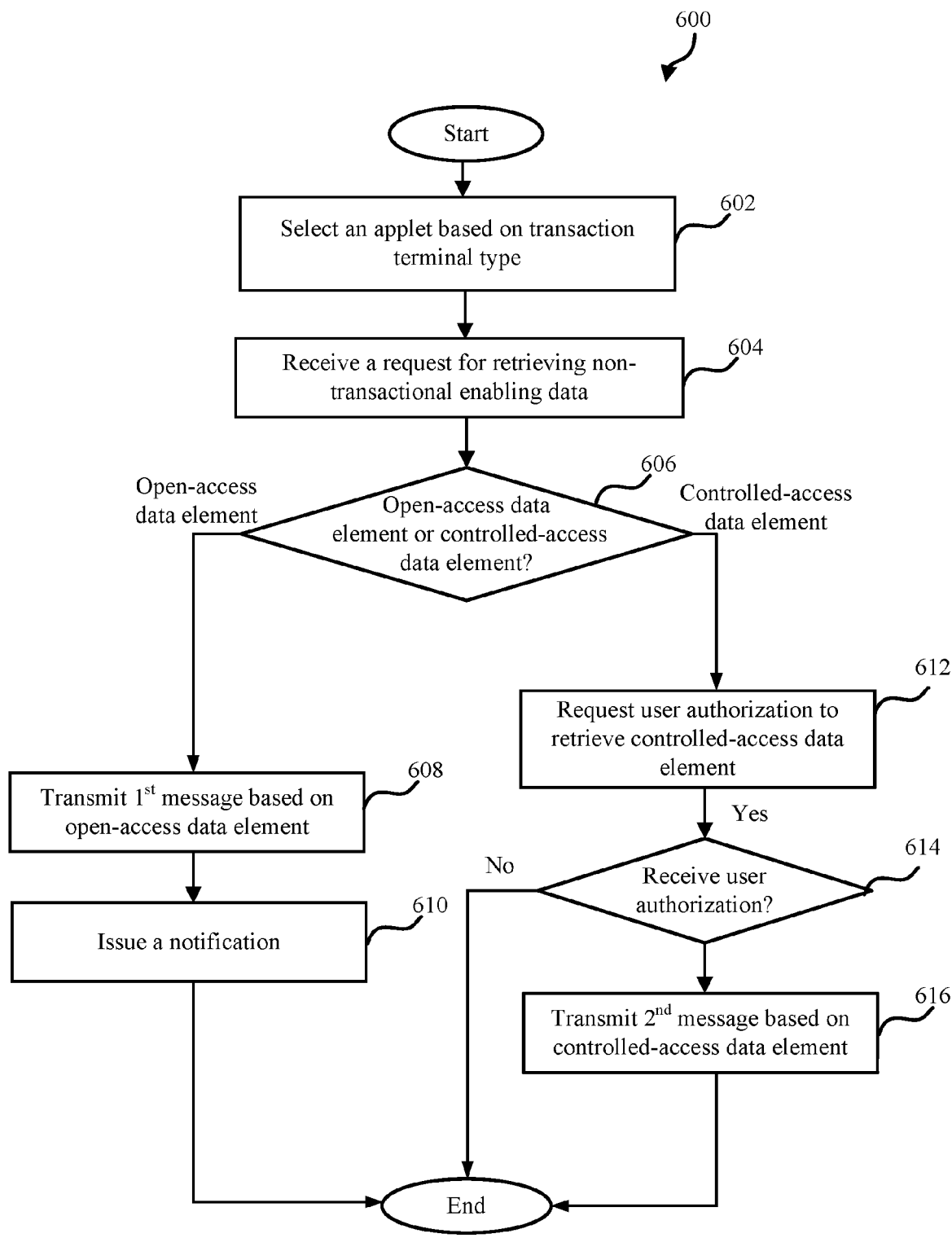
FIG. 6 illustrates another example flowchart for processing wireless transactions, according to some embodiments.

FIG. 6 illustrates another example flowchart 600 for processing wireless transactions, according to some embodiments. Generally speaking, flowchart 600 is a more detailed example of flowchart 500 in FIG. 5. The operations depicted in flowchart 600 may be performed by an electronic device such as electronic devices 101-104 of FIG. 1 and electronic device 200 of FIG. 2. It is to be appreciated that not all operations may be needed to perform the disclosure provided herein. Further, some of the operations may be performed simultaneously, or in a different order than shown in FIG. 6. Moreover, one or more additional operations also can be performed.

At 602, an applet is selected based on a type of the transaction terminal. In some embodiments, processing subsystem 210 and/or secure transaction subsystem 270 of electronic device 200 may select the appropriate applet 272 from applets 272a-n based on the type of transaction terminal 302 for conducting transactions between electronic device 200 and transaction terminal 302. Each of applets 272a-n may act as a credential (e.g., virtual card) including a virtual payment card, such as a transit card or a merchant card, and a virtual access card. Each of applets 272a-n (and the associated credential) may perform transactions with a corresponding type of transaction terminal 302.

In order to make the selection, in some embodiments, electronic device 200 may first determine if it is near a transaction terminal 302 (e.g., stationary merchant terminal 130, mobile merchant terminal 132, or gate terminals 140A-C of FIG. 1) based on location data received from location server 120. If electronic device 200 determines that it is near transaction terminal 302, electronic device 200 may receive a command from transaction terminal 302 identifying the type of transaction terminal 302. Electronic device 200 then may select applet 272 that is designed to conduct transactions with the specific type of transaction terminal 302.

In some embodiments, a "wallet" application may be displayed to a user of the electronic device when performing the transaction. The wallet application can display a list of eligible virtual cards or other credentials for use with the nearby transaction terminal. Based on the list of eligible virtual cards, the electronic device can receive a confirmation from the user on which virtual card to use for the transaction—e.g., a default virtual payment card can be selected by a user's touch on a fingerprint identity sensor or another virtual payment card can be selected by the user. In some embodiments, a list of eligible virtual payment cards can be presented to the user. If the user does not make a selection within a predetermined distance from the transaction terminal (e.g., 30 cm away from the terminal), a default Express Card can be automatically selected by the electronic device for the transaction. Further, in some embodiments, a length of time in which eligible virtual cards are presented to the user may vary. For example, if the user is in a hurry (e.g., as determined by the speed the user approaches the nearby transaction terminal), the electronic device may present the list of eligible virtual cards when the user is farther away from the transaction terminal (e.g., 100 cm, a meter, etc. away from the transaction terminal) as compared to if the user is moving more slowly, in which case the electronic device can present the list of eligible virtual cards when the user is closer to the transaction terminal (e.g., 50 cm away from the transaction terminal). In some embodiments, a default Express Card can be automatically selected based on a location and/or terminal type without any presentation, e.g., to a device user.

With the applet (and associated credential) being selected, either automatically, semi-automatically, or manually, the electronic device may wait to make contact (communicatively) with the transaction terminal prior to processing the transaction. In some embodiments, electronic device 200 may detect contact with transaction terminal 302 via an NFC radio or an RFID radio (e.g., NFC radio 236 or RFID radio 237 of FIG. 2). For example, an NFC radio has a nominal range of 4 centimeters and contact can be detected within this range.

After contact is detected, a transaction between the electronic device-using the selected applet—and the transaction terminal may be performed based on transaction enabling data stored in the electronic device. In some embodiments, a transit gate terminal transaction may be performed between the electronic device and a transit gate terminal. A virtual transit card associated with a transit gate terminal may store a remaining balance that can be used to process the transaction, according to some embodiments.

In some embodiments, the electronic device may interact with a payment terminal in a way that requires communication with a payment network associated with a financial institution. Prior to an interaction with the payment terminal, a confirmation operation may be performed, according to some embodiments. For example, the electronic device may prompt the user of the electronic device to enter confirmation such as, for example, a PIN number or a biometric indicator (e.g., a fingerprint, a facial image, or a voice sample). The confirmation may be employed depending on the type of terminal interacting with the electronic device. For example, the electronic device may require confirmation for a purchase of goods or services. In some embodiments, the payment terminal may communicate with a server within the payment network to conduct the transaction. The payment terminal sends a transaction data block to the electronic device and receives a "signed" transaction data block from the electronic device indicating that the user of the electronic device authorizes the transaction, according to some embodiments. This signed transaction data block can be sent to the payment network, where a financial account associated with the user may be debited for the amount specified by the signed transaction data block.

In addition to the transaction enabling data described above that is necessary for performing the transactions between the electronic device and the transaction terminal, sometimes, the transaction terminal may also request non-transaction enabling data from the electronic device. Accordingly, at 604, a request for retrieving non-transaction enabling data may be received by the electronic device from the transaction terminal. In some embodiments, the selected applet 272 of electronic device 200 may receive the request from transaction terminal 302 for retrieving non-transaction enabling data 226.

At 606, whether the requested non-transaction enabling data corresponds to open-access data element or controlled-access data element may be determined. The open-access data element may be associated with a recent transaction conducted by the electronic device. In some embodiments, applet 272 of electronic device 200 may make the determination since different actions may be initiated for different types of non-transaction enabling data 226 to balance the user experience versus user privacy protection.

If the requested non-transaction enabling data corresponds to an open-access data element, flowchart 600 proceeds to 608, where a first message including or based on the open-access data element is transmitted by the electronic device to the transaction terminal as a response to the request. In some embodiments, applet 272 of electronic device 200 may retrieve the requested open-access data element 308, such as the last one or two transit records (or other such transactions), and transmit a return message with the requested open-access data element 308 to transaction terminal 302.

At 610, a notification regarding the transmission of the return message with the requested non-transaction enabling data may be issued by the electronic device. In some embodiments, user 401 of electronic device 200 may receive the notification issued by applet 272 of electronic device 200.

Referring back to 606, if the requested non-transaction enabling data corresponds to controlled-access data element, flowchart 600 proceeds to 612, where user authorization is requested prior to retrieval of the non-transaction enabling data. In some embodiments, applet 272 of electronic device 200 may ask for user 401's authorization before releasing the requested controlled-access data element 306 to transaction terminal 302.

At 614, whether user authorization has been received is determined. In some embodiments, if no user authorization is received by applet 272 of electronic device 200, either by exceeding a preset time period or receiving an explicit user input refusing the release of the requested controlled-access data element 306, applet 272 of electronic device 200 will not transmit the requested controlled-access data element 306 to transaction terminal 302, and flowchart 600 ends. In some embodiments, as a result, the transaction may fail on the terminal, and the user would need to authenticate and present electronic device 200 to the terminal again. In some embodiments, the user may be informed that the terminal attempted to read data that the terminal does not require to complete transaction. For example, this may be in the case where the merchant has modified the terminal in order to gain more information about clients/users, or when someone with a portable contactless read device attempted to read sensitive information from electronic device 200 without the user being aware (e.g., hidden in the crowded metro).

Otherwise, if user authorization is received by the electronic device, then at 616, a second message including or based on the requested controlled-access data element may be transmitted by the electronic device to the transaction terminal as the response to the request. In some embodiments, applet 272 of electronic device 200 may retrieve the requested controlled-access data element 306 and transmit a return message with the controlled-access data element 306 to transaction terminal 302.

Figure 7:
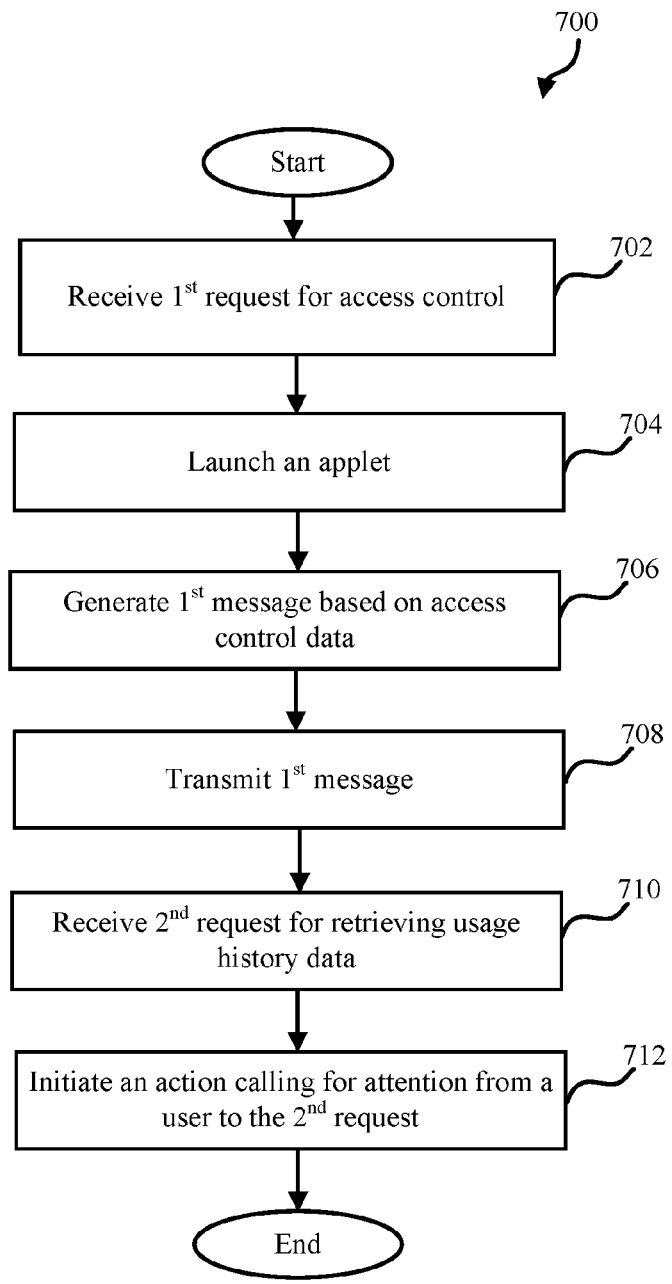
FIG. 7 illustrates an example flowchart for wireless access control, according to some embodiments.

FIG. 7 illustrates an example flowchart 700 for wireless access control, according to some embodiments. The operations depicted in flowchart 700 may be performed by an electronic device such as electronic devices 101-104 of FIG. 1 and electronic device 200 of FIG. 2. It is to be appreciated that not all operations may be needed to perform the disclosure provided herein. Further, some of the operations may be performed simultaneously, or in a different order than shown in FIG. 7.

In some embodiments as illustrated in FIG. 7, the transaction between the electronic device and the transaction terminal may be non-financial transaction. The transaction may be, for example, a user using a credential (e.g., virtual access card) stored in the electronic device to gain access to a controlled area, e.g., an office building or a secured data repository, by wirelessly interacting with an access control gate terminal. At 702, a first request for access control is received by the electronic device from the access control gate terminal. In some embodiments, electronic device 200 may receive the request from the access control gate terminal, for example, for validating the virtual access card in electronic device 200.

At 704, in response to the request, an applet may be launched. In some embodiments, applet 272 acting as the credential (e.g., virtual access card) corresponding to the access control gate terminal may be launched on electronic device 200. Applet 272 may retrieve the access control data requested by the access control gate terminal, for example, the data needed for validating the virtual access card, e.g., the expiration date and status of the virtual access card.

At 706, a first message including or based on the requested access data may be generated. In some embodiments, applet 272 may generate the message based on the retrieved access control data. At 708, the first message is transmitted by the electronic device to the access control gate terminal. In some embodiments, applet 272 of electronic device 200 may transmit a return message with the requested access data to the access control gate terminal.

At 710, a second request for retrieving usage history data (or other non-transaction enabling data) may be received by the electronic device from the access control gate terminal. Usage history data may include the usage records of the virtual access card (and associated applet). Usage history data may be an example of non-transaction enabling data as disclosed herein as it is not part of access control data that is necessary for enabling the access control transaction. In some embodiments, applet 272 of electronic device 200 may receive the second request for usage history data.

At 712, in response to the second request, an action calling for attention from the user to the second request may be initiated by the electronic device. In some embodiments, in the case of controlled-access data elements, applet 272 of electronic device 200 may request authorization from the user to retrieve the requested usage history data, and may not release the requested usage history data unless it receives such authorization from the user. Also or alternatively, in the case of open-access data elements, applet 272 of electronic device 200 may release the requested usage history data to the access control gate terminal without prior use authorization, and at the same time, issue a notification to the user about the request from the access control gate terminal for the usage history data.

Figure 8:
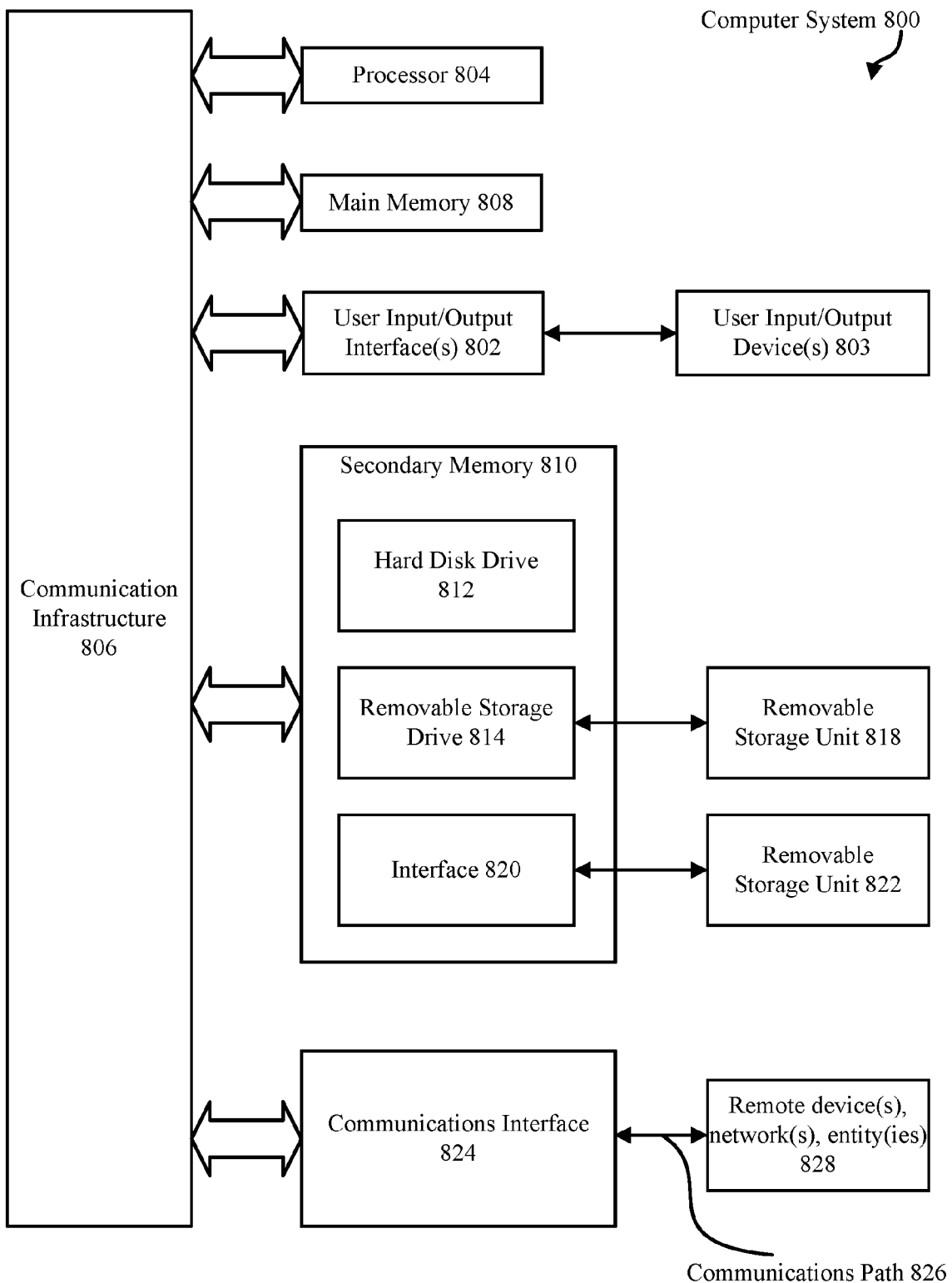
FIG. 8 illustrates a block diagram of an example computer system, according to some embodiments.

Various embodiments can be implemented, for example, using one or more computer systems, such as computer system 800 shown in FIG. 8. Computer system 800 can be any well-known computer capable of performing the functions described herein. For example, and without limitation, computer system 800 can be configured to protect non-transaction enabling data, such as transaction history data, from unauthorized retrieval during wireless transactions. For example, one or more computer systems 800 can be configured to perform operations related to some or all of the electronic devices (e.g., electronic devices 101-104 of FIG. 1 and electronic device 200 of FIG. 2), the transaction terminals (e.g., stationary merchant terminal 130 of FIG. 1, mobile merchant terminal 132 of FIG. 1, and gate terminals 140A-C of FIG. 1), and the location servers (e.g., location server 120 of FIG. 1) described above with respect to FIGS. 1-7.

Computer system 800 includes one or more processors (also called central processing units, or CPUs), such as a processor 804. Processor 804 is connected to a communication infrastructure or bus 806. Computer system 800 also includes input/output device(s) 803, such as monitors, keyboards, pointing devices, etc., that communicate with communication infrastructure or bus 806 through input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of removable storage unit 822 and interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, embodiments of the disclosure as contemplated, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described embodiments, but should be defined only in accordance with the following claims and their equivalents.

What is claimed is:

1. A mobile electronic device for processing a wireless transaction, comprising:
   a wireless communication interface configured to communicate with a transaction terminal;
   a memory configured to store a first set of transaction enabling data for enabling a wireless transaction between the mobile electronic device and the transaction terminal, and a second set of non-transaction enabling data different from the first set of transaction enabling data; and
   a processor configured to execute an applet configured to:
   receive, from the transaction terminal, a first request for conducting the wireless transaction;
   transmit to the transaction terminal, in response to receiving the first request, a first message based at least in part on the first set of transaction enabling data;
   receive, from the transaction terminal, a second request for retrieving at least part of the second set of non-transaction enabling data; and
   determine whether release of the at least part of the second set of non-transaction enabling data has been authorized, wherein the second set of non-transaction enabling data comprises transaction history data.

2. The mobile electronic device of claim 1, wherein the first set of transaction enabling data and the second set of non-transaction enabling data each include at least one respective data item.

3. The mobile electronic device of claim 1, wherein the second set of non-transaction enabling data comprises at least one open-access data element and at least one controlled-access data element.

4. The mobile electronic device of claim 3, wherein the at least one open-access data element is associated with a recent transaction conducted by the mobile electronic device.

5. The mobile electronic device of claim 3, wherein the applet is further configured to:
   determine that the at least part of the second set of non-transaction enabling data corresponds to the at least one open-access data element; and
   transmit to the transaction terminal, in response to the determination, a second message based at least in part on the at least one open-access data element without prior authorization.

6. The mobile electronic device of claim 5, wherein the applet is further configured to:
   in response to the determination, issue a notification regarding the transmission of the second message.

7. The mobile electronic device of claim 3, wherein the applet is further configured to:
   determine that the at least part of the second set of non-transaction enabling data corresponds to the at least one controlled-access data element; and
   in response to the determination, request authorization to release the at least one controlled-access data element.

8. The mobile electronic device of claim 7, wherein the applet is further configured to:
   receive authorization to release the at least one controlled-access data element; and
   transmit, to the transaction terminal, a second message based at least in part on the at least one controlled-access data element.

9. The mobile electronic device of claim 1, wherein the applet is configured to act as a credential that is authorized to conduct transactions with the transaction terminal.

10. The mobile electronic device of claim 9, wherein the credential comprises a transit card or a merchant card.

11. The mobile electronic device of claim 1, wherein the processor is further configured to:
    select the applet from a plurality of applets based at least in part on a type of the transaction terminal.

12. The mobile electronic device of claim 1, wherein the wireless communication interface is configured to communicate with the transaction terminal via near-field communication (NFC).

13. A method for processing a wireless transaction, comprising:
    storing a first set of transaction enabling data for enabling a wireless transaction between a mobile electronic device and a transaction terminal, and a second set of non-transaction enabling data different from the first set of transaction enabling data in a secure transaction subsystem;
    receiving a first request for conducting the wireless transaction;
    transmitting, in response to receiving the first request, a first message based at least in part on the first set of transaction enabling data;
    receiving a second request for retrieving at least part of the second set of non-transaction enabling data; and
    determining whether release of the at least part of the second set of non-transaction enabling data has been authorized, wherein the second set of non-transaction enabling data comprises transaction history data.

14. The method of claim 13, wherein the transaction history data includes transaction history data within a certain time frame.

15. The method of claim 13, wherein at least one open-access data element is associated with a recent transaction conducted by the mobile electronic device.

16. The method of claim 13, further comprising: in response to determining that the at least part of the second set of non-transaction enabling data corresponds to at least one open-access data element, issuing a notification regarding the transmission of the first message.

17. The method of claim 13, further comprising: selecting an applet from a plurality of applets based on a type of the transaction terminal, wherein the applet includes a credential that is authorized to conduct the wireless transaction, and wherein the credential is associated with a transit card or a merchant card.

18. The method of claim 13, wherein the storing comprises storing the first set of transaction enabling data and the second set of non-transaction enabling data in a secure transaction subsystem.

19. A non-transitory computer-readable medium storing instructions that, when executed by a processor of a mobile electronic device, cause the processor to perform operations for processing a wireless transaction, the operations comprising:

storing, in a secure transaction subsystem, a first set of transaction enabling data for enabling a wireless transaction between the mobile electronic device and a transaction terminal, and a second set of non-transaction enabling data different from the first set of transaction enabling data;

receiving a first request for conducting the wireless transaction;

transmitting, in response to receiving the first request, a first message based at least in part on the first set of transaction enabling data;

receiving a second request for retrieving at least part of the second set of non-transaction enabling data; and determining whether release of the at least part of the second set of non-transaction enabling data has been authorized, wherein the second set of non-transaction enabling data comprises transaction history data.

20. The method of claim 13, wherein the second set of non-transaction enabling data comprises a certain number of past transactions.

* * * * *